United States Patent
Marueli et al.

(10) Patent No.: US 11,972,370 B2
(45) Date of Patent: Apr. 30, 2024

(54) SYSTEM FOR NAVIGATING DRIVER TO PASSENGER FOR RIDE AUTHORIZED BY ANOTHER USER OF TRANSPORTATION SERVICE

(71) Applicant: Lyft, Inc., San Francisco, CA (US)

(72) Inventors: Sunny Marueli, Nes Ziona (IL); Talmon Marco, Tel Aviv (IL)

(73) Assignee: Lyft, Inc., San Francisco, CA (US)

( * ) Notice: Subject to any disclaimer, the term of this patent is extended or adjusted under 35 U.S.C. 154(b) by 602 days.

(21) Appl. No.: 16/852,249

(22) Filed: Apr. 17, 2020

(65) Prior Publication Data
US 2020/0349474 A1    Nov. 5, 2020

Related U.S. Application Data

(63) Continuation of application No. 14/966,760, filed on Dec. 11, 2015, now Pat. No. 10,635,994.

(51) Int. Cl.
*G06Q 10/02*    (2012.01)
*G06Q 50/00*    (2012.01)
*G06Q 50/30*    (2012.01)

(52) U.S. Cl.
CPC ............ *G06Q 10/02* (2013.01); *G06Q 50/01* (2013.01); *G06Q 50/30* (2013.01)

(58) Field of Classification Search
CPC ........ G06Q 10/02; G06Q 50/01; G06Q 50/30; G06Q 50/40
See application file for complete search history.

(56) References Cited

U.S. PATENT DOCUMENTS

| | | | |
|---|---|---|---|
| 8,014,756 B1 | 9/2011 | Henderson | |
| 8,255,162 B2 * | 8/2012 | Okude | G01C 21/3446 701/425 |
| 8,706,409 B2 * | 4/2014 | Mason | G06Q 10/063112 701/457 |
| 10,837,788 B1 | 11/2020 | Kentley-Klay et al. | |
| 2002/0099599 A1 | 7/2002 | Minassian | |
| 2002/0174030 A1 * | 11/2002 | Praisner | G07F 7/08 705/39 |
| 2006/0100909 A1 | 5/2006 | Glimp et al. | |
| 2006/0143125 A1 | 6/2006 | Cartwright et al. | |
| 2006/0259353 A1 | 11/2006 | Gutmann | |

(Continued)

FOREIGN PATENT DOCUMENTS

JP    2009-86716    * 4/2009 ............ G07B 13/00

OTHER PUBLICATIONS

Russo, Edward, "City fines Uber over licensing violation," The Register—Guard, Eugene, Oregon, Nov. 20, 2014, A.1.*

(Continued)

*Primary Examiner* — Nathan Erb
(74) *Attorney, Agent, or Firm* — Keller Preece PLLC

(57) ABSTRACT

In one embodiment a transportation request is received from a computing device of a first subscriber to a transportation service. It is determined that the transportation request is authorized by a second subscriber to the transportation service. One or more details associated with the transportation request and location information of the computing device of the first subscriber are communicated to a computing device of a driver associated with the transportation service to allow the driver to fulfill the transportation request.

20 Claims, 5 Drawing Sheets

(56) References Cited

U.S. PATENT DOCUMENTS

| | | |
|---|---|---|
| 2010/0228574 A1 | 9/2010 | Mundinger et al. |
| 2011/0238289 A1 | 9/2011 | Lehmann et al. |
| 2011/0301985 A1 | 12/2011 | Camp et al. |
| 2012/0209640 A1 | 8/2012 | Hamper |
| 2013/0013381 A1* | 1/2013 | Liu .................. H04W 4/44 705/13 |
| 2013/0054281 A1 | 2/2013 | Thakkar et al. |
| 2013/0124279 A1 | 5/2013 | Bodin et al. |
| 2013/0204524 A1* | 8/2013 | Fryer ............... G06Q 10/047 701/527 |
| 2013/0325735 A1 | 12/2013 | Bellmund |
| 2013/0339098 A1* | 12/2013 | Looman .......... G06Q 10/0637 705/7.36 |
| 2014/0250122 A1 | 9/2014 | Fredericks et al. |
| 2015/0066557 A1* | 3/2015 | Lichti ............ G06Q 10/06311 705/34 |
| 2015/0339928 A1* | 11/2015 | Ramanujam ......... G08G 1/202 701/23 |
| 2016/0042303 A1 | 2/2016 | Medina et al. |
| 2016/0110836 A1 | 4/2016 | Garg et al. |
| 2016/0301698 A1* | 10/2016 | Katara .............. G06F 16/9554 |
| 2016/0321771 A1 | 11/2016 | Liu et al. |
| 2016/0332535 A1 | 11/2016 | Bradley et al. |
| 2016/0364823 A1 | 12/2016 | Cao |
| 2017/0012920 A1* | 1/2017 | Chheda ................ H04W 4/02 |
| 2017/0127215 A1* | 5/2017 | Khan .................. H04W 12/64 |
| 2017/0228683 A1 | 8/2017 | Hu et al. |
| 2017/0300053 A1 | 10/2017 | Wengreen et al. |
| 2018/0017405 A1 | 1/2018 | Chen et al. |
| 2019/0171798 A1 | 6/2019 | Boghossian et al. |
| 2019/0360833 A1 | 11/2019 | Liu et al. |
| 2020/0005414 A1 | 1/2020 | Matsumoto |
| 2020/0013020 A1 | 1/2020 | Yang et al. |
| 2020/0023812 A1 | 1/2020 | Hassani |
| 2021/0150656 A1 | 5/2021 | Yasui et al. |
| 2022/0101633 A1 | 3/2022 | Nishiyama et al. |

OTHER PUBLICATIONS

U.S. Appl. No. 14/966,760, Apr. 6, 2018, Office Action.
U.S. Appl. No. 14/966,760, Nov. 6, 2018, Office Action.
U.S. Appl. No. 14/966,760, May 8, 2019, Office Action.
U.S. Appl. No. 14/985,575, Mar. 7, 2022, Office Action.
U.S. Appl. No. 14/985,575, Jul. 28, 2022, Notice of Allowance.
Russo, Edward, "City fines Uber over licensing violation," The Register—Guard, RG Media Company, Eugene, Or., Nov. 20, 2014, A.1.
Carson, Biz; Business Insider; "This investor has an interesting theory on what Google will do with its self-driving cars"; Jun. 30, 2015.
U.S. Appl. No. 14/966,760, Jan. 9, 2020, Notice of Allowance.
U.S. Appl. No. 14/985,575, Nov. 12, 2019, Office Action.
U.S. Appl. No. 14/985,575, Apr. 3, 2023, Office Action.
Tremoulet, et al., Transporting Children in Autonomous Vehicles: An Exploratory Study, Human Factors, Mar. 2020, pp. 278-277 (Year: 2020).
U.S. Appl. No. 16/834,158, Mail Date Sep. 28, 2022, Preinterview 1st Office Action.
U.S. Appl. No. 16/834,158, Mail Date Nov. 18, 2022, 1st Action Office Action.
U.S. Appl. No. 16/834,158, Mail Date Feb. 2, 2023, Office Action.
U.S. Appl. No. 16/834,158, Mail Date Jun. 2, 2023, Office Action.
U.S. Appl. No. 16/834,158, Mail Date Sep. 14, 2023, Office Action.

* cited by examiner

1

SYSTEM FOR NAVIGATING DRIVER TO PASSENGER FOR RIDE AUTHORIZED BY ANOTHER USER OF TRANSPORTATION SERVICE

CROSS-REFERENCE TO RELATED APPLICATIONS

The present application is a continuation of U.S. application Ser. No. 14/966,760, filed on Dec. 11, 2015. The aforementioned application is hereby incorporated by reference in its entirety.

TECHNICAL FIELD

This disclosure relates in general to the field of mobile applications and, more particularly, to a system for navigating a driver to a passenger for a ride authorized by another user of a transportation service.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a transportation request is received from a computing device of a first subscriber to a transportation service. It is determined that the transportation request is authorized by a second subscriber to the transportation service. One or more details associated with the transportation request and location information of the computing device of the first subscriber are communicated to a computing device of a driver associated with the transportation service to allow the driver to fulfill the transportation request.

Example Embodiments

Figure 1:
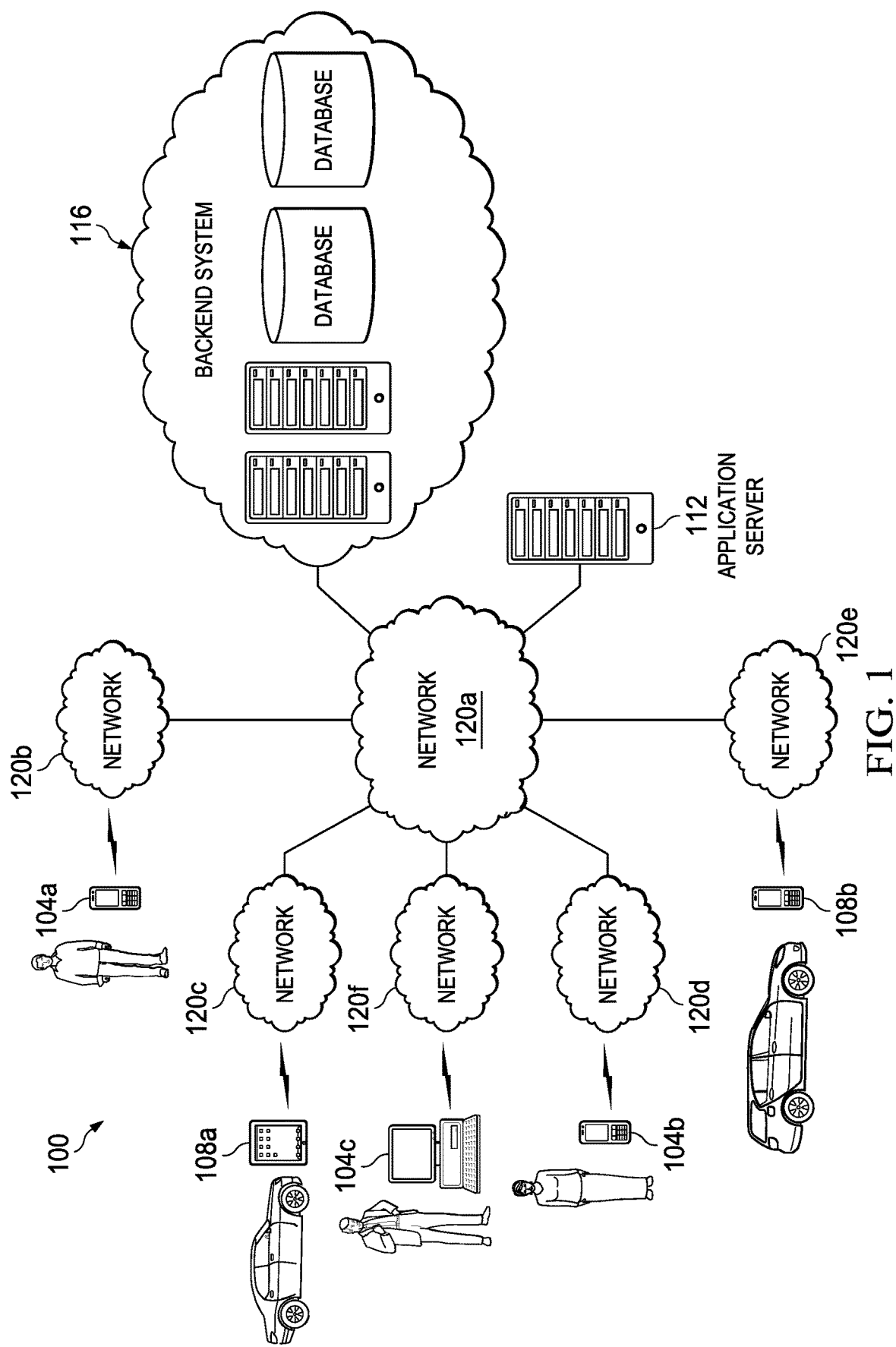
FIG. 1 illustrates a block diagram of a system for navigating a driver to a passenger for a ride authorized by another user of a transportation service in accordance with certain embodiments.

FIG. 1 illustrates a block diagram of a system 100 for navigating a driver to a passenger for a ride authorized by another user of a transportation service in accordance with certain embodiments. Although various embodiments may include any number of drivers, passengers, and associated devices, system 100 depicts three passengers having associated computing devices 104 and two drivers having associated computing devices 108. The devices are coupled through various networks 120 to an application server 112 and a backend system 116.

Various embodiments of the present disclosure may enhance the experience of passengers associated with a transportation service by allowing a passenger's ride to be authorized and/or paid for by a different person or entity. The transportation request may be formulated by any suitable entity, such as the passenger or the same entity that is authorizing the transportation request. In various embodiments, an authorizing entity may provide authorization criteria for one or more users that preemptively authorizes transportation requests created by those users that is within the bounds of the authorization criteria. In various embodiments, details associated with the ride (e.g., a current location of the driver) may be provided to both the passenger and the entity that authorizes the ride.

Devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, a computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations, driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., mobile device 108 or logic therein).

In particular embodiments, a passenger application runs on computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card or bank account numbers and associated information), or car preference information (e.g., what models or color of car the user prefers).

The application may allow a user to request a ride from the transportation service. In various embodiments, the application may establish a pick-up location automatically or based on user input (e.g., locations may include the current location of the mobile device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's device is not logged in to the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., as well as other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term computing device is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
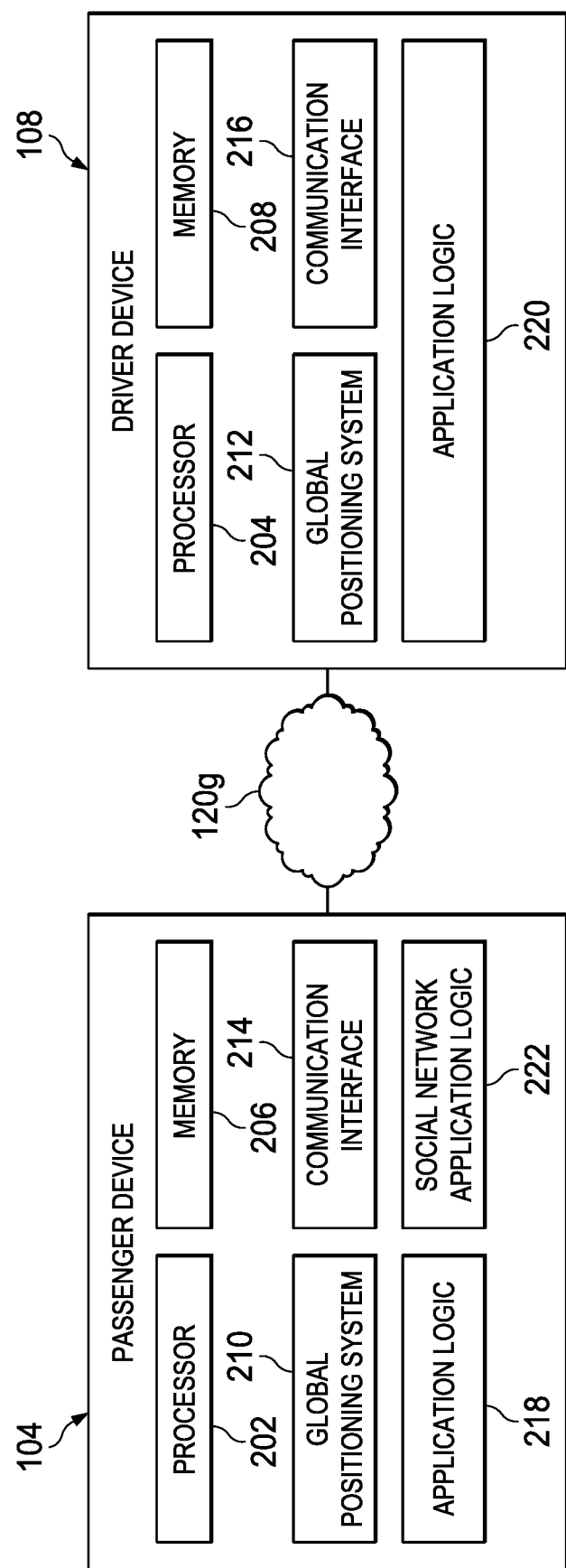
FIG. 2 illustrates a block diagram of a passenger device and a driver device of the system of FIG. 1 in accordance with certain embodiments.

FIG. 2 illustrates a block diagram of a passenger device 104 and a driver device 108 of the system of FIG. 1 in accordance with certain embodiments. Herein, "passenger device" may be used to refer to a computing device used by a subscriber that has registered an account with the transportation service or other user who interacts with the transportation service (e.g., by communicating with the transportation service to authorize transportation requests for others or to request transportation) while "driver device" may be used to refer to a computing device used by a driver of the transportation service. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

Processors 202 and 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands or data generated independently of voice commands (e.g., data may be generated and communicated in response to receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of computing devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the passenger application, application logic 218 may provide additional features to enhance the user experience of a passenger or entity authorizing a transportation request for a passenger.

As used herein, an "authorizing entity" may be used to refer to an individual or other entity (e.g., a company or other organization) that authorizes a transportation request for a passenger. In various embodiments, the authorizing entity is a subscriber to the transportation service. That is, the authorizing entity has registered with the transportation service by providing or establishing information associated with the entity, such as contact information (e.g., real names and addresses), user names and passwords (or other authentication information), payment information (e.g., credit card or bank account numbers and associated information), or other account information. In the various embodiments described herein, "authorization" may refer to approval of a transportation request, an agreement to provide payment for a transportation request, or both an approval of and an agreement to pay for the transportation request.

In various embodiments, the authorizing entity may create a transportation request for a different entity (e.g., another subscriber to the transportation service or another individual). In a particular embodiment, application logic 218 allows the authorizing entity to provide any suitable information associated with the transportation request, such as an identification of the passenger, a pick-up location, a destination location, a pick-up time (e.g., immediately or some time in the future), a method of payment (e.g., a specification of a card or account from which payment should be drawn), or other suitable information. In various embodiments, the authorizing party may request a vehicle that has particular merchandise available or particular criteria for the driver, such as a minimum performance rating, such that drivers having performance ratings below the minimum performance rating will not be considered during selection of the driver. In various embodiments, some of this information (e.g., a method of payment) may be provided by the authorizing entity after an initial request is made (e.g., during the ride or after the ride is complete).

The passenger may be identified in any suitable manner. In some embodiments, the passenger is also a subscriber to the transportation service. In such embodiments, the passenger may be identified by the user name the passenger uses to log in to the transportation service or other identifying information (e.g., name, phone number, email address, social network profile information, or other identifying information) that may allow backend system to correlate the request with the user account of the passenger. In other embodiments, the passenger is not a subscriber to the transportation service. In such embodiments, any suitable identifying information about the passenger may be provided such as the passenger's name, phone number, email address, social network profile information, or other identifying information.

The pick-up location may also be specified in any suitable manner. In some embodiments, the authorizing party may explicitly provide the location at which the passenger should be picked up. In other embodiments, the authorizing party may specify that the passenger should be picked up at the current location of the passenger (e.g., as measured by a GPS system of a device of the passenger). If the passenger is a subscriber to the transportation service, the location of the passenger (e.g., as measured by GPS 210) may be collected and sent to backend system 116 by application logic 218. Alternatively, if the passenger is not a subscriber to the transportation service, other methods for collecting the location of the passenger may be used. For example, backend system 116 may send a link to the passenger computing device 104 which will result in allowing access to data from the GPS 210 (e.g., by downloading a temporary application and/or granting permission to access GPS data) or the driver or a computer associated with backend system 116 may be prompted to call the passenger computing device 104 to ask for a location.

Once a request has been generated by the authorizing entity via application logic 218, the request may be sent to backend system 116 for processing. The reception of a request generated by the authorizing entity for a different passenger may represent authorization for the request to the backend system 116 (e.g., additional explicit approval is not required).

In some embodiments, the authorizing entity may authorize a request formed by a passenger (e.g., another subscriber to the transportation service or another individual). The passenger may generate the request using application logic 218 of the passenger's device in a manner similar to that described above when a passenger generates a standard transportation request (that does not require authorization by the authorizing entity). In some embodiments, the generation of the request may also include an explicit indication by the passenger that a different entity will be authorizing the transportation request. In other embodiments, some or all requests by a particular passenger may require authorization by a different entity and the application logic 218 may indicate such when sending the request or the backend system 116 may sense that authorization is required (for example by accessing account data associated with the passenger). For example, a parent may act as an authorizing entity for all or some transportation requests generated by a device of one or more children, or a corporate entity may act as an authorizing entity for all or some transportation requests generated by the devices of one or more employees of the corporate entity. Similarly, the identity of the authorizing party may be explicitly provided in the request or may be determined based on information associated with the passenger's account. In various embodiments, multiple authorizing parties (e.g., a mom and a dad) may be identified in a request. In a particular embodiment, the transportation request generated by the authorizing party may include a method of payment for the transportation request (alternatively a method of payment may be provided during the ride or upon completion of the ride). In a particular embodiment, the transportation request may specify whether the authorizing party or the passenger should receive credit for the ride (e.g., if the transportation service provides a loyalty awards program).

The authorizing party may be identified in any suitable manner. In some embodiments, the authorizing party is a subscriber to the transportation service. In such embodiments, the authorizing party may be identified by the user name the authorizing party uses to log in to the transportation service or other identifying information (e.g., name, phone number, email address, social network profile information, or other identifying information) that may allow backend system to correlate the request with the user account of the authorizing party. In other embodiments, the authorizing party is not a subscriber to the transportation service. In such embodiments, any suitable identifying information about the authorizing party may be provided such as the authorizing party's name, phone number, email address, social network profile information, or other identifying information.

Regardless of whether a request is generated by the authorizing party or by the passenger, a driver may be selected for the request using any suitable methodology (such as that described herein with respect to the selection of a driver for a normal request from a passenger).

When authorization is needed for a transportation request, one or more messages requesting authorization may be sent to a computing device 104 of the authorizing party (or multiple potential authorizing parties). The one or more messages may also include any of the information described above that may be entered in association with the generation of the request by the passenger or other information associated with the transportation request (e.g., any of the information described herein that would normally be presented to a passenger such as a cost of the request, a distance of the request, information about a driver that is to fulfill the request, etc.). In one embodiment, the one or more messages requesting authorization are received and presented to the authorizing party through application logic 218. In other embodiments, the messages may be presented to the authorizing party using other suitable logic, such as a text message application, an email application, a voice call, an instant messaging application, a social networking application, or other suitable application or program. The authorizing party may utilize any suitable logic (such as one of these various applications) to send one or more messages (e.g., to backend system 116) authorizing the transportation request. In a particular embodiment, the one or more messages sent by the computing device of the authorizing party may include a method of payment for the transportation request (alternatively a method of payment may be provided during the ride or upon completion of the ride). In a particular embodiment, the one or more messages may specify whether the authorizing party or the passenger should receive credit for the ride (e.g., if the transportation service provides a loyalty awards program).

In various embodiments, an authorizing party can set preapproved criteria that is stored by the authorizing party's computing device 104 or backend system 116 such that requests meeting the criteria may be automatically approved without requiring user input from the authorizing party at the time of the request. In some embodiments, application logic 118 may be used to input such criteria. Any suitable criteria associated with transportation requests may be entered by the authorizing party. In various embodiments, the authorizing party may specify types of rides that are preapproved by specifying acceptable values for any of the parameters of a transportation request described herein. For example, the criteria might specify a maximum price for a ride. As another example, the criteria might specify one or more pickup or destination locations that are preapproved. For example, a parent may specify that for one or more children only rides to school or home are preapproved. As another example, the criteria might specify a time range (e.g., normal working hours) during which rides are preapproved.

The authorizing party may specify any suitable combinations of criteria that when met result in approval of a ride. For example, the authorizing party may specify that when any one of a plurality of different criteria are met, the ride is preapproved. As another example, the authorizing party may specify that multiple criteria must be met for the ride to be preapproved. If the preapproved criteria are not met, the request may be automatically declined (by the computing device 104 or backend system 116) or user input from the authorizing party may be solicited (e.g., backend system 116 may send a message to the computing device of the authorizing party querying whether the transportation request is to be authorized).

The computing device of the authorizing party may display various information about the transportation request before, during, or after the fulfillment of the transportation request. For example, any suitable combination of the information described herein as being shown to the passenger may also be shown to the authorizing party. In one embodiment, contact information of the driver (or an option to contact the driver if the transportation service does not wish to reveal the contact information of the driver) fulfilling the request may be provided to the authorizing party. In a particular embodiment, the authorizing party may be sent a notification in response to the passenger being picked up by the driver. For example, this message may be sent in response to a message received from the driver indicating the pickup or in response to a detection by the backend system 116 that the pickup has occurred (e.g., the backend system 116 may detect that the driver's location and the passenger's location are changing in sync with each other). The authorizing party may also be sent updated location data of the driver or passenger so that the authorizing party may track the progress of the transportation request. In a particular embodiment, the authorizing party may be sent a notification in response to the passenger reaching the destination location. For example, this message may be sent in response to a message received from the driver indicating the destination location has been reached or in response to a detection by the backend system 116 that the destination location has been reached (e.g., the backend system 116 may detect that the driver's location and/or the passenger's location correspond to the destination location).

The computing device of the passenger may display various information about the authorized transportation request before, during, or after the fulfillment of the transportation request. For example, any suitable combination of the information described herein as being shown to the passenger in association with a request not requiring authorization may be shown to the passenger in association with a request requiring authorization. In various embodiments, the computing device (e.g., via application logic 118 or other logic such as a text message application, email application, social networking application, instant message application, etc.) of the passenger may receive a notification in response to a determination that the transportation request has been authorized by an authorizing party.

In various embodiments, any of the communication described herein for generating transportation requests or authorizing transportation requests may be accomplished using a social network application of the passenger or authorizing entity. In a particular embodiment, a user may supply login credentials for a social network system (e.g., FACEBOOK) or other social media system (e.g., TWITTER) to the transportation service through application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request or authorize a ride and may relay received requests or authorizations for rides to backend system 116 along with any suitable identifying information about the passenger to facilitate pickup by a driver.

In various embodiments of the present disclosure, in addition to any combination of the features described above with respect to the driver application, application logic 220 may also provide contact information for the passenger and/or authorizing entity and/or the ability to contact the passenger and/or authorizing entity through the application (e.g., via a phone call, email, instant message, or text). Moreover, any of the identification information of the passenger provided by the authorizing entity may be provided to the driver to allow the driver to verify that he is picking up the correct passenger. In various embodiments, any suitable combination of information associated with the passenger and the transportation request may be provided to the driver (e.g., any of the information described herein that would be provided to the driver if the transportation request had come from the passenger and didn't require authorization).

Figure 3:
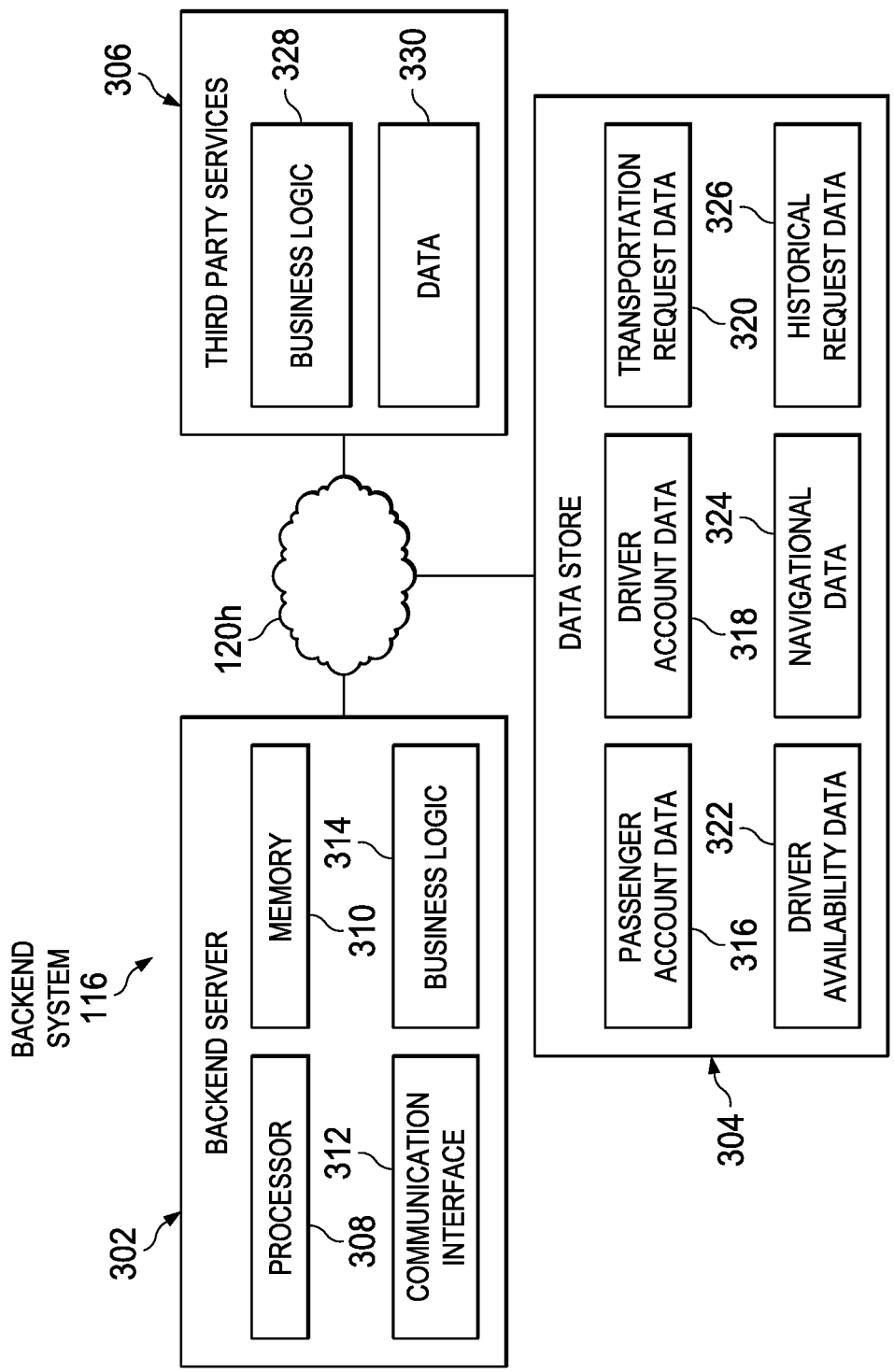
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120*h*. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers.

In the embodiment depicted, backend server 302 includes a computer system to facilitate performance of its operations. As an example, backend server 302 includes one or more processors 308, memory elements 310, and communication interfaces 312, among other hardware and software.

These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

In various embodiments, passenger account data 316 may include information associated with the authorization of transportation requests. For example, the passenger account data 316 of an authorizing entity may include preapproved criteria for transportation requests and an indication of which passenger(s) the preapproved criteria applies to. As another example, preapproved criteria created by an authorizing entity for a particular passenger may be stored in the passenger's account data 316. In particular embodiments, passenger account data 316 of an authorizing entity may include one or more indications of passengers that the authorizing entity has previously authorized requests for and may communicate this information to a computing device of the authorizing entity to allow quick selection of a passenger when the authorizing entity is generating a request for the passenger (alternatively such information may be stored locally on the computing device).

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a request requires authorization by an authorizing entity, whether the request has been authorized, whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

Navigational data 324 may comprise information supporting navigation functions provided by the passenger applications and driver passenger applications. For example, navigational data 324 may comprise map data that may be sent to passenger devices 104 (of passengers and authorizing entities) and driver devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger device 104 and each driver device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a user opens the passenger application, the backend server 302 may log the passenger in based on a comparison of authentication information provided by the passenger device 104 with authentication information stored in passenger account data 316. The user may then generate a transportation request for himself or for another user. The request is received by the backend server 302 and stored in transportation request data 320. Backend server 302 may determine whether authorization is required for the request and may communicate with one or more authorized parties to obtain the authorization. Once authorization is obtained, backend server 302 may send message indicating that authorization has been obtained to a computing device of the passenger. If the transportation request was generated by the authorizing entity, then any suitable details associated with the request may also be communicated to the computing device of the passenger. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger and/or authorizing entity that a driver has accepted the request and provides any suitable information associated with the driver (e.g., driver's current location, model and color of vehicle, estimated time of arrival, etc.) to the passenger and/or authorizing entity.

The backend server 302 may provide navigation information (e.g., the passenger's current location and directions to the current location or other pickup location) to the driver device 108 to direct the driver to the passenger's pickup location and subsequently to direct the driver to the passenger's destination location. The backend server 302 may also provide real-time updates associated with the trip to the passenger, the authorizing entity, and the driver.

Once the passenger's destination location has been reached, the backend server 302 may facilitate payment of the fare for the trip using payment information stored in passenger account data 316 or other payment information provided by the authorizing entity and/or driver account data 318. The backend server 302 may also receive ratings associated with the trip for the passenger and driver and store these ratings in data store 304.

Backend server 302 may be operable to track the status of drivers associated with the transportation service and adjust the sending of transportation requests to the drivers based on their status. For example, backend server 302 may exclude drivers having an unavailable status or may only send particular transportation requests (e.g., requests meeting criteria previously established by the driver) to drivers having an inactive status.

Figure 4:
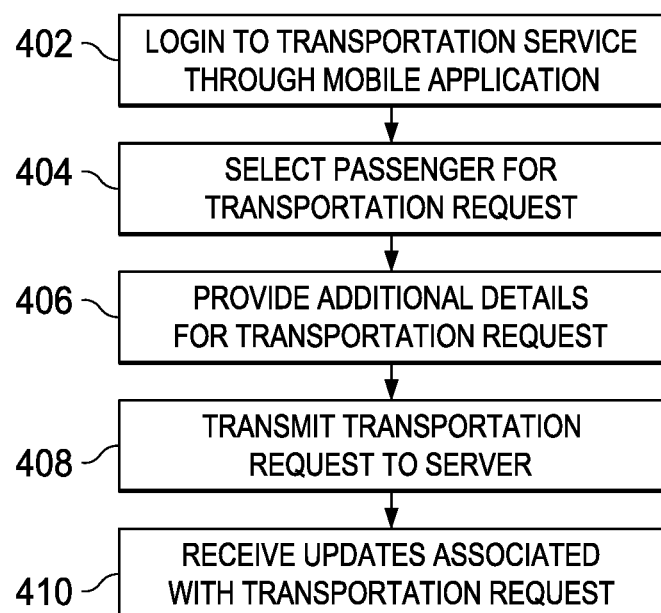
FIG. 4 illustrates a method for authorizing a transportation request for another user in accordance with certain embodiments.

FIG. 4 illustrates a method for authorizing a transportation request for another user in accordance with certain embodiments. The steps of FIG. 4 may be performed, for example, by a computing device 104. At step 402, computing device 104 logs an authorizing entity in to the transportation system through a mobile application, such as the passenger mobile application described herein. At step 404, the authorizing entity selects a passenger for a transportation request. The passenger may be selected in any suitable manner. In a particular embodiment, contacts of the authorizing entity (e.g., individuals for which the authorizing entity has stored contact information on computing device 104) may be analyzed to determine whether any of the contacts are also subscribers to the transportation service. The contacts that are subscribers may be presented to the authorizing entity and the authorizing entity may select one of the subscribers as the passenger. In another embodiment, the authorizing entity may provide contact information (e.g., a phone number or email address) of the passenger and the backend system 116 may determine that the contact information corresponds to a subscriber of the transportation service. In other embodiments, the authorizing entity may select a contact from an address book stored on computing device 104 or a remote server and at least a portion of the information associated with the contact is sent to the backend system. In some embodiments, the authorizing entity manually enters identifying information for the passenger which is then sent to the backend system.

At step 406, additional details associated with the transportation request are provided. These additional details may include any of the transportation request parameters discussed herein, such as a pickup location, a destination location, payment information, or other suitable information. At step 408, the transportation request is transmitted to a server, such as backend server 302. At step 410, the authorizing entity receives updates associated with the transportation request. For example, the authorizing entity may be notified when the driver picks up the passenger, may receive location information of the driver or passenger during the ride, and may receive a notification when the destination location has been reached.

Some of the steps illustrated in FIG. 4 may be repeated, combined, modified or deleted where appropriate, and additional steps may also be included. Additionally, steps may be performed in any suitable order or concurrently without departing from the scope of particular embodiments.

Figure 5:
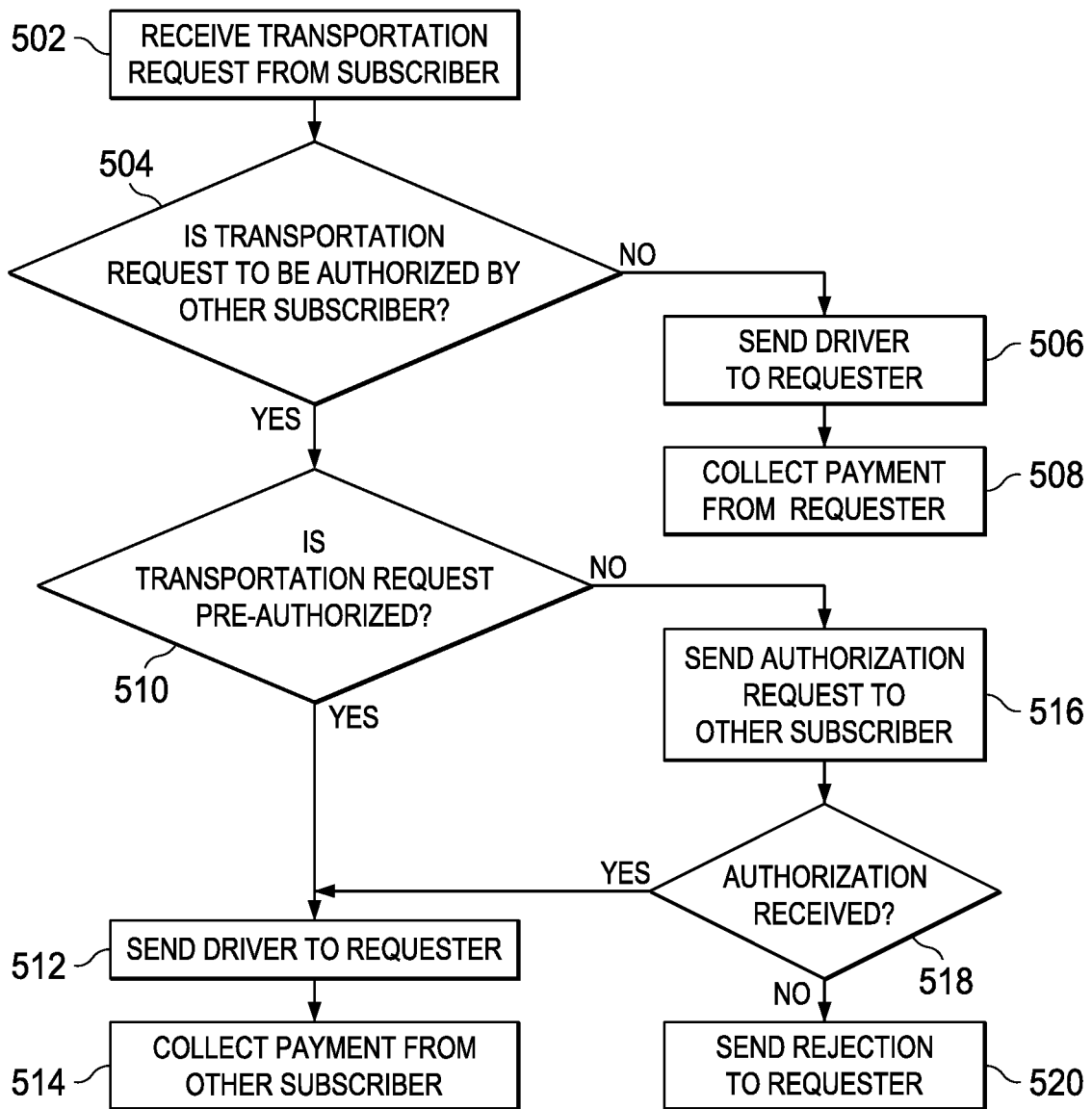
FIG. 5 illustrates a method for fulfilling a transportation request for a passenger wherein the request is authorized by a different user in accordance with certain embodiments.

FIG. 5 illustrates a method for fulfilling a transportation request for a passenger wherein the request is authorized by a different user in accordance with certain embodiments. The steps of FIG. 5 may be performed, for example, by a backend server 302.

At step 502, a transportation request is received from a subscriber or other user of the transportation service. At step 504, it is determined whether the transportation request needs to be authorized by another subscriber (or other entity). For example, the transportation request itself may include an indication that it should be authorized before being fulfilled. As another example, backend system 116 may utilize data stored by backend system 116 in conjunction with information included in the request to determine whether authorization is needed. For example, account data of the passenger may indicate that authorization is needed for all transportation requests or for particular types of transportation requests.

If the transportation request does not need to be authorized, a driver is sent to the requesting passenger at step 506 and payment is collected from the requesting passenger at step 508. If the transportation request needs to be authorized, it is determined at step 510 whether the transportation has been pre-authorized by another subscriber. For example, an authorizing entity may send preapproval criteria to backend system 116 that allows specified types of transportation requests by specified passengers to be approved without requiring explicit approval by the authorizing entity at the time of the transportation request. If it is determined that the transportation request is pre-authorized, a driver is sent to the requesting passenger at step 512 and payment is collected from the other subscriber (i.e., the authorizing entity) at step 514.

If it is determined at step 510 that the transportation request is not pre-authorized, an authorization request is sent to the other subscriber (i.e., the authorizing entity) at step 516. At step 518, it is determined whether authorization has been received. For example, it may be determined that authorization has not been received if an explicit rejection message is received back from the other subscriber or if no response from the other subscriber is received after a time out period has elapsed. If authorization is received back from the other subscriber, then a driver is sent to the requesting passenger at step 512 and payment is collected from the other subscriber at step 514. If authorization is not granted, then a rejection message is sent to the requesting passenger at step 520.

Some of the steps illustrated in FIG. 5 may be repeated, combined, modified or deleted where appropriate, and additional steps may also be included. Additionally, steps may be performed in any suitable order or concurrently without departing from the scope of particular embodiments.

It is also important to note that the steps in FIGS. 4-5 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger devices 104 or driver devices 108 where appropriate. Similarly, certain functionality described herein as being performed by a passenger device 104 or a driver device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, at one or more servers a transportation request transmitted from an authorizing computing device of an authorizing user to transport a passenger computing device of a passenger from a pickup location to a destination location;
   determining, via the one or more servers, that the transportation request is authorized based on determining that an account of the passenger is associated with an account of the authorizing user;
   based on determining the transportation request is authorized, providing navigational information to a driver computing device, the navigational information causing the driver computing device to present navigational directions to fulfill the transportation request;

detecting a fulfillment status during the transportation request by determining whether a current passenger location of the passenger computing device corresponds to a current driver location of the driver computing device; and in response to determining that the current passenger location corresponds to the current driver location:
providing, for display based on detecting a fulfillment status during the transportation request, a first notification comprising information regarding the fulfillment status to a first user interface of the authorizing computing device; and
providing, for display based on detecting the fulfillment status during the transportation request, a second notification comprising the information regarding the fulfillment status to a second user interface of the passenger computing device.

2. The method of claim 1, wherein determining that the transportation request is authorized is further based on identifying a payment method corresponding to the account of the authorizing user that is pre-authorized to be applied to transportation requests corresponding to the account of the passenger.

3. The method of claim 1, further comprising:
determining a location of the driver computing device during a fulfillment of the transportation request; and
wherein providing the fulfillment status during the transportation request to the authorizing computing device and the passenger computing device comprises providing the location of the driver computing device.

4. The method of claim 1, further comprising:
determining an estimated time of arrival for a vehicle corresponding to the driver computing device to arrive at the pickup location associated with the transportation request; and
wherein providing the fulfillment status to the authorizing computing device and the passenger computing device comprises providing the estimated time of arrival.

5. The method of claim 1, further comprising providing, to both the authorizing computing device and the passenger computing device, information associated with the driver computing device comprising at least one of driver identification information, vehicle information, driver rating, or driver location.

6. The method of claim 1, further comprising:
providing, to the authorizing computing device, a pickup notification based on determining that the passenger has started a ride within a vehicle associated with the driver computing device; and
providing, to the authorizing computing device, a notification based on determining the passenger of the passenger computing device has reached the destination location.

7. The method of claim 1, further comprising:
determining a completion of the transportation request; and
processing a payment for the transportation request using a payment method associated with the account of the authorizing user.

8. A system comprising:
at least one processor; and
at least one non-transitory computer readable storage medium storing instructions that, when executed by the at least one processor, cause the system to:
receive, at one or more servers a transportation request transmitted from an authorizing computing device of an authorizing user to transport a passenger computing device of a passenger from a pickup location to a destination location;
determine, via the one or more servers, that the transportation request is authorized based on determining that an account of the passenger is associated with an account of the authorizing user;
based on determining the transportation request is authorized, provide navigational information to a driver computing device, the navigational information causing the driver computing device to present navigational directions to fulfill the transportation request;
detect a fulfillment status during the transportation request by determining whether a current passenger location of the passenger computing device corresponds to a current driver location of the driver computing device; and
in response to determining that the current passenger location corresponds to the current driver location:
provide, for display based on detecting a fulfillment status during the transportation request, a first notification comprising information regarding the fulfillment status to a first user interface of the authorizing computing device; and
provide, for display based on detecting the fulfillment status during the transportation request, a second notification comprising the information regarding the fulfillment status to a second user interface of the passenger computing device.

9. The system of claim 8, wherein determining that the transportation request is authorized is further based on identifying a payment method corresponding to the account of the authorizing user that is pre-authorized to be applied to transportation requests corresponding to the account of the passenger.

10. The system of claim 8, further comprising instructions that, when executed by the at least one processor, cause the system to:
determine a location of the driver computing device during a fulfillment of the transportation request; and
wherein providing the fulfillment status to the authorizing computing device and the passenger computing device comprises providing the location of the driver computing device.

11. The system of claim 8, further comprising instructions that, when executed by the at least one processor, cause the system to:
determine an estimated time of arrival for a vehicle corresponding to the driver computing device to arrive at the pickup location associated with the transportation request; and
wherein providing the fulfillment status to the authorizing computing device and the passenger computing device comprises providing the estimated time of arrival.

12. The system of claim 8, further comprising instructions that, when executed by the at least one processor, cause the system to provide, to both the authorizing computing device and the passenger computing device, information associated with the driver computing device comprising at least one of driver identification information, vehicle information, driver rating, or driver location.

13. The system of claim 8, further comprising instructions that, when executed by the at least one processor, cause the system to:

provide, to the authorizing computing device, a pickup notification based on determining that the passenger is in a vehicle associated with the driver computing device; and provide, to the authorizing computing device, a notification based on determining the passenger of the passenger computing device has reached the destination location.

14. The system of claim 8, further comprising instructions that, when executed by the at least one processor, cause the system to:

determine a completion of the transportation request; and process a payment for the transportation request using a payment method associated with the account of the authorizing user.

15. A non-transitory computer readable medium storing instructions thereon that, when executed by at least one processor device, cause the at least one processor device to:

receive, at one or more servers a transportation request transmitted from an authorizing computing device of an authorizing user to transport a passenger computing device of a passenger from a pickup location to a destination location;

determine, via the one or more servers, that the transportation request is authorized based on determining that an account of the passenger is associated with an account of the authorizing user;

based on determining the transportation request is authorized, provide navigational information to a driver computing device, the navigational information causing the driver computing device to present navigational directions to fulfill the transportation request;

detect a fulfillment status during the transportation request by determining whether a current passenger location of the passenger computing device corresponds to a current driver location of the driver computing device; and in response to determining that the current passenger location corresponds to the current driver location:

provide, for display based on detecting a fulfillment status during the transportation request, a first notification comprising information regarding the fulfillment status to a first user interface of the authorizing computing device; and provide, for display based on detecting the fulfillment status during the transportation request, a second notification comprising the information regarding the fulfillment status to a second user interface of the passenger computing device.

16. The non-transitory computer readable medium of claim 15, wherein determining that the transportation request is authorized is further based on identifying a payment method corresponding to the account of the authorizing user that is pre-authorized to be applied to transportation requests corresponding to the account of the passenger.

17. The non-transitory computer readable medium of claim 15, further comprising instructions that, when executed by the at least one processor device, cause the at least one processor device to:

determine a location of the driver computing device during a fulfillment of the transportation request; and wherein providing the fulfillment status to the authorizing computing device and the passenger computing device comprises providing the location of the driver computing device.

18. The non-transitory computer readable medium of claim 15, further comprising instructions that, when executed by the at least one processor device, cause the at least one processor device to:

determine an estimated time of arrival for a vehicle corresponding to the driver computing device to arrive at the pickup location associated with the transportation request; and wherein providing the fulfillment status to the authorizing computing device comprises providing the estimated time of arrival.

19. The non-transitory computer readable medium of claim 15, further comprising instructions that, when executed by the at least one processor device, cause the at least one processor device to:

provide, to the authorizing computing device, a pickup notification based on determining that the passenger is in a vehicle associated with the driver computing device; and provide, to the authorizing computing device, a notification based on determining the passenger of the passenger computing device has reached the destination location.

20. The non-transitory computer readable medium of claim 15, further comprising instructions that, when executed by the at least one processor device, cause the at least one processor device to:

determine a completion of the transportation request; and process a payment for the transportation request using a payment method associated with the account of the authorizing user.

* * * * *